United States Patent
Liu et al.

(10) Patent No.: US 12,475,461 B2
(45) Date of Patent: Nov. 18, 2025

(54) BLOCKCHAIN-BASED DATA PROCESSING METHOD AND APPARATUS

(71) Applicant: Beijing Jingdong Qianshi Technology Co., Ltd., Beijing (CN)

(72) Inventors: Ruifei Liu, Beijing (CN); Wenfeng Yang, Beijing (CN); Dongyang Xi, Beijing (CN); Binbin Xiu, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 215 days.

(21) Appl. No.: 18/266,217

(22) PCT Filed: Dec. 21, 2021

(86) PCT No.: PCT/CN2021/140072
§ 371 (c)(1),
(2) Date: Jun. 8, 2023

(87) PCT Pub. No.: WO2022/143298
PCT Pub. Date: Jul. 7, 2022

(65) Prior Publication Data
US 2023/0394483 A1 Dec. 7, 2023

(30) Foreign Application Priority Data
Jan. 4, 2021 (CN) .......................... 202110002609.2

(51) Int. Cl.
*H04L 29/06* (2006.01)
*G06F 21/51* (2013.01)
(Continued)

(52) U.S. Cl.
CPC .......... *G06Q 20/401* (2013.01); *G06F 21/51* (2013.01); *G06Q 20/3825* (2013.01);
(Continued)

(58) Field of Classification Search
CPC .. G06F 21/62; G06F 21/6209; G06F 21/6218; G06F 21/6227; G06F 21/64;
(Continued)

(56) References Cited

U.S. PATENT DOCUMENTS

2019/0253239 A1* 8/2019 Shao ...................... H04L 9/0891
2019/0324772 A1* 10/2019 Fan ...................... G06F 9/44521
(Continued)

FOREIGN PATENT DOCUMENTS

CN 108833398 A 11/2018
CN 109493042 A 3/2019
(Continued)

OTHER PUBLICATIONS

Office Action isuued in CN 202110002609.2 on Jul. 19, 2023.

*Primary Examiner* — Malcolm Cribbs
(74) *Attorney, Agent, or Firm* — Venable LLP; Henry J. Daley

(57) ABSTRACT

A blockchain-based data processing method, apparatus and storage medium provides flexible smart contract deployment without restarting. In response to receiving a contract deployment request sent from a requesting node in a blockchain network, a contract file corresponding to the contract deployment request is acquired. The contract file is generated by performing content extension on a smart contract corresponding to the contract deployment request. Validation is performed on the contract file based on an analysis result of the contract file and a blockchain account book, wherein the validation is used to characterize performing validation on a secret key of the contract file, a content of the contract file, and a signature of a contract participant. The blockchain account book is generated by pre-executing a contract deployment transaction. In response to the contract file passing the validation, a smart contract corresponding to
(Continued)

the contract deployment request according to the contract file is determined.

20 Claims, 4 Drawing Sheets

(51) Int. Cl.
*G06Q 20/38* (2012.01)
*G06Q 20/40* (2012.01)
*H04L 9/00* (2022.01)

(52) U.S. Cl.
CPC ..... *G06Q 20/3827* (2013.01); *G06Q 20/3829* (2013.01); *H04L 9/50* (2022.05)

(58) Field of Classification Search
CPC .... G06F 16/1824; G06F 21/44; G06F 21/629; G06F 16/2379; G06F 16/9027; H04L 9/0643; H04L 9/30; H04L 2209/38; H04L 9/0637; H04L 9/0618; H04L 9/3247; H04L 9/3239; H04L 9/3263; H04L 2209/56; H04L 9/0656; G06Q 20/06; G06Q 20/382; G06Q 20/401; G06Q 2220/00; G06Q 20/381; G06Q 40/04; G06Q 20/3825; G06Q 20/3827; G06K 9/00577; G06K 2009/00583

See application file for complete search history.

(56) References Cited

U.S. PATENT DOCUMENTS

| | | | |
|---|---|---|---|
| 2020/0327545 A1* | 10/2020 | Xie | G06Q 20/223 |
| 2022/0207022 A1* | 6/2022 | Wood | G06F 16/2379 |
| 2023/0081152 A1* | 3/2023 | Blazevige | G06Q 20/20 |
| | | | 705/42 |

FOREIGN PATENT DOCUMENTS

| | | |
|---|---|---|
| CN | 111221904 A | 6/2020 |
| CN | 111984271 A | 11/2020 |
| CN | 112651741 A | 4/2021 |
| JP | 2018128723 A | 8/2018 |
| JP | 2020-515092 A | 5/2020 |
| JP | 2020-528222 A | 9/2020 |
| WO | 2020/249572 A1 | 12/2020 |

* cited by examiner

100

Acquire, in response to receiving a contract deployment request sent from a requesting node in a blockchain network, a contract file corresponding to the contract deployment request — 101

Perform validation on the contract file based on an analysis result of the contract file and a blockchain account book — 102

Determine, in response to the contract file passing the validation, a smart contract corresponding to the contract deployment request according to the contract file — 103

```
┌─────────────────────────────────────────────────────────────────────┐
│ Acquire, in response to receiving a contract deployment request sent from a requesting node │──── 301
│   in a blockchain network, a contract file corresponding to the contract deployment request │
└─────────────────────────────────────────────────────────────────────┘
                                    │
┌─────────────────────────────────────────────────────────────────────┐
│ Analyze a content of the contract file to obtain a method name data packet of methods in the │
│   contract file, a parameter data packet corresponding to the methods in the contract file, a │──── 302
│   signature data packet of a contract participant, and a secret key packet of the contract file │
└─────────────────────────────────────────────────────────────────────┘
                                    │
┌─────────────────────────────────────────────────────────────────────┐
│ Perform validation on the contract file based on the method name data packet of the methods │
│   in the contract file, the parameter data packet corresponding to the methods in the contract │──── 303
│   file, the signature data packet of the contract participant, the secret key packet of the contract │
│                       file, and a blockchain account book │
└─────────────────────────────────────────────────────────────────────┘
                                    │
┌─────────────────────────────────────────────────────────────────────┐
│   Determine, in response to the contract file passing the validation, a smart contract │──── 304
│     corresponding to the contract deployment request according to the contract file │
└─────────────────────────────────────────────────────────────────────┘
```

Fig. 3

BLOCKCHAIN-BASED DATA PROCESSING METHOD AND APPARATUS

CROSS-REFERENCE TO RELATED APPLICATIONS

The present disclosure is a national stage of International Application No. PCT/CN2021/140072, filed on Dec. 21, 2021, which claims priority to Chinese Patent Application No. 202110002609.2 filed on 4 Jan. 2021. Both of the aforementioned applications are hereby incorporated by reference in their entireties.

TECHNICAL FIELD

Embodiments of the present disclosure relate to the technical field of computers, specifically relate to the technical field of blockchains, and more specifically relate to a blockchain-based data processing method and apparatus.

BACKGROUND

Emerged in a Bitcoin system presented by Satoshi Nakamoto, a blockchain technology is essentially a shared database, and has advantages, such as decentralization, non-tamperability, openness, and transparency. A smart contract is a concept presented by Szabo in 1997. In a blockchain system, the smart contract is an executable computer program including a logical sequence running on a blockchain database, and is autonomously executable when a predefined condition in its source code is satisfied. The smart contract is automatically executable in the absence of a trusted third party, thereby reducing trust costs between a plurality of mutually distrusting contract participants.

However, at present, in the blockchain system, it is necessary to modify a smart contract code by recompiling a blockchain node code and restart a blockchain service, thereby increasing the workload of operation and maintenance personnel, and increasing the probability of system errors.

SUMMARY

Embodiments of the present disclosure provide a method and apparatus for blockchain-based data processing, an electronic device and a storage medium.

According to a first aspect, some embodiments of the present disclosure provide a method for blockchain-based dada processing. The method includes: in response to receiving a contract deployment request sent from a requesting node in a blockchain network, acquiring a contract file corresponding to the contract deployment request, wherein the contract file is generated by performing content extension on a smart contract corresponding to the contract deployment request, and the smart contract is an automatically executable service code in the blockchain; performing validation on the contract file based on an analysis result of the contract file and a blockchain account book, wherein the validation is used to characterize performing validation on a secret key of the contract file, a content of the contract file, and a signature of a contract participant, wherein the blockchain account book is generated by pre-executing a contract deployment transaction; and in response to the contract file passing the validation, determining a smart contract corresponding to the contract deployment request according to the contract file.

According to a second aspect, some embodiments of the present disclosure provide an apparatus for blockchain-based data processing. The apparatus includes: an acquisition unit configured to acquire, in response to receiving a contract deployment request sent from a requesting node in a blockchain network, a contract file corresponding to the contract deployment request, wherein the contract file is generated by performing content extension on a smart contract corresponding to the contract deployment request, and the smart contract is an automatically executable service code in the blockchain; a validation unit configured to perform validation on the contract file based on an analysis result of the contract file and a blockchain account book, wherein the validation is used to characterize performing validation on a secret key of the contract file, a content of the contract file, and a signature of a contract participant, wherein the blockchain account book is generated by pre-executing a contract deployment transaction; and a determination unit configured to determine, in response to the contract file passing the validation, a smart contract corresponding to the contract deployment request according to the contract file.

According to a third aspect, some embodiments of the present disclosure provide an electronic device, the electronic device includes: at least one processor; and a memory communicatively connected to the at least one processor; where the memory stores instructions executable by the at least one processor, and the instructions are executed by the at least one processor, such that the at least one processor can execute the method according to any one of the implementations described in the first aspect.

According to a fourth aspect, some embodiments of the present disclosure provide a non-transitory computer-readable storage medium, storing computer instructions thereon, wherein the computer instructions are used for causing the computer to execute the method according to any one of the implementations described in the first aspect.

It should be understood that the description in this section is not intended to identify key or critical features of the embodiments of the present disclosure, nor is it intended to limit the scope of the present disclosure. Other features of the present disclosure will become readily apparent from the following description.

BRIEF DESCRIPTION OF THE DRAWINGS

The accompanying drawings are used for better understanding of the present scheme, and do not impose any limitation on the present disclosure.

FIG. 1 is a schematic diagram of a method for blockchain-based data processing according to a first embodiment of the present disclosure;

FIG. 3 is a schematic diagram of the method for blockchain-based data processing according to a second embodiment of the present disclosure;

DETAILED DESCRIPTION OF EMBODIMENTS

Figure 2:
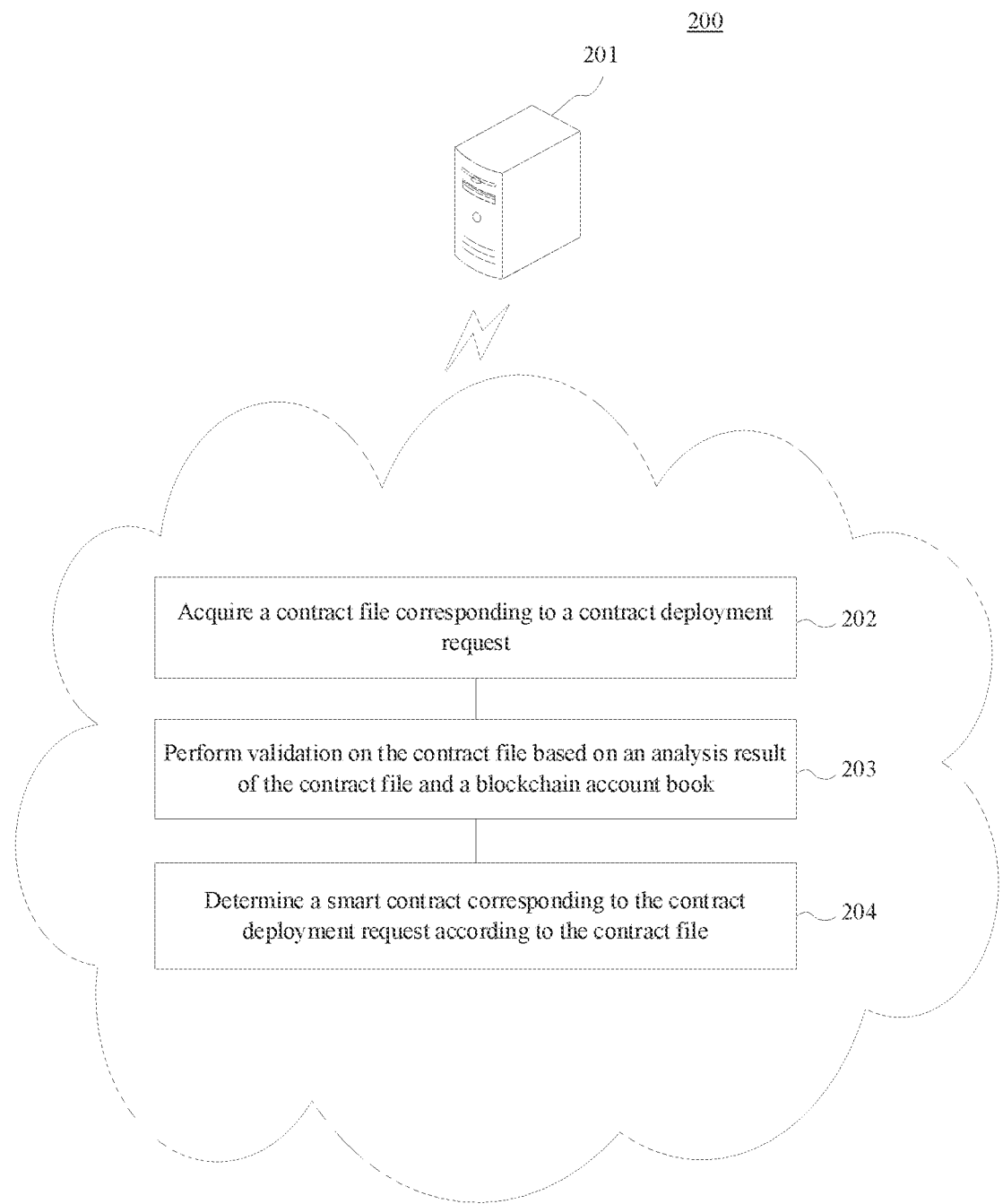
FIG. 2 is a scenario diagram in which the method for blockchain-based data processing according to an embodiment of the present disclosure may be implemented.

Example embodiments of the present disclosure are described below with reference to the accompanying drawings, including various details of embodiments of the present disclosure to contribute to understanding, which should be considered merely as examples. Therefore, those of ordinary skills in the art should realize that various alterations and modifications may be made to the embodiments described here without departing from the scope and spirit of the present disclosure. Similarly, for clearness and conciseness, descriptions of well-known functions and structures are omitted in the following description.

It should be noted that embodiments in the present disclosure and the features in the embodiments may be combined with each other on a non-conflict basis. Embodiments of the present disclosure will be described in detail below with reference to the accompanying drawings.

The technology according to the present disclosure acquires, in response to receiving a contract deployment request sent from a requesting node in a blockchain network, a contract file corresponding to the contract deployment request, where the contract file is generated by performing content extension on a smart contract corresponding to the contract deployment request, performs validation on the contract file based on an analysis result of the contract file and a blockchain account book, and determines, in response to the contract file passing the validation, a smart contract corresponding to the contract deployment request according to the contract file, thereby extending a file format of the smart contract file (ELF file) to dynamically load the smart contract file, and running a new smart contract without the need of restarting a blockchain node. A file type of the smart contract ELF file is extended, to perform safety control on a smart contract binary itself, and achieve the purpose of safely dynamically loading the smart contract. The blockchain account book is generated by pre-executing the contract deployment transaction, thereby dynamically setting a smart contract method and parameters, and more flexibly limiting a method for implementing the smart contract and a template for implementing the smart contract. The validation is performed based on a secret key of the contract file, a content of the contract file, and a signature of a contract participant, thereby avoiding security risks and a possibility of secret key leakage caused by introducing a third-party secret key center in the prior art, and ensuring non-repudiation and integrity of a contract deployer and a contract approver.

FIG. 1 shows a schematic diagram 100 of a method for blockchain-based data processing according to a first embodiment of the present disclosure. The method for blockchain-based data processing includes the following steps:

Step 101: acquiring, in response to receiving a contract deployment request sent from a requesting node in a blockchain network, a contract file corresponding to the contract deployment request.

In the present embodiment, in the blockchain network, when receiving the contract deployment request sent from a requesting node, an executing body (for example, a smart contract server) may acquire the contract file corresponding to the contract deployment request by wired connection or wireless connection. The contract file may be generated by performing content extension on a smart contract corresponding to the contract deployment request. A file type of the contract file may be ELFext extended from the smart contract file (ELF file), and the smart contract is an automatically executable service code in a blockchain. It should be noted that the wireless connection may include, but is not limited to, 3G, 4G, or 5G connection, WiFi connection, Bluetooth connection, WiMAX connection, Zigbee connection, UWB (ultra wideband) connection, and other wireless connections that are known at present or are to be developed in the future.

It should be further noted that a smart contract code exists in an ELF file format after compilation, and code logic of the ELF file is automatically executed when a service triggers an invoking condition thereof. In order to ensure non-tamperability of the ELF file, and reflect unified consensus of blockchain participants on this contract, it is necessary to add a customized attribute (referred to as an additional attribute) on basis of the original ELF file format. The additional attribute includes the following contents: an encrypted method name data packet, an encrypted parameter data packet corresponding to methods, a signature data packet of signature of a contract participant, a secret key packet of the contract file, and a ciphertext packet of the smart contract. For the method name data packet, method names are encrypted using a CBC mode of a 3DES algorithm. For the parameter data packet, method parameters are encrypted using the CBC mode of the 3DES algorithm. For the signature data packet, smart contract participants sign a smart contract binary file using their respective private keys to generate a signature value list. For the secret key packet of the contract file, a work key is a system random number, a public key of a blockchain node is used for operation, and it is further necessary to compute CRC32 values of secret keys, to check for subsequent use. For the ciphertext packet of the smart contract, a binary stream of the smart contract is encrypted using a symmetric algorithm, thereby ensuring confidentiality of the smart contract during smart contract circulation. As additional attributes, the above attributes are written into an additional attribute region of the ELF file to form a customized ELFext file.

Step 102: performing validation on the contract file based on an analysis result of the contract file and a blockchain account book.

In the present embodiment, the executing body may analyze the contract file obtained in step 101, and perform validation on the contract file based on the analysis result and corresponding information in the blockchain account book. The contract file validation may be used to characterize validation on a secret key of the contract file, a content of the contract file, and a signature of a contract participant, and the blockchain account book is generated by pre-executing the transaction of the contract deployment.

In some alternative implementations, the blockchain account book is generated by: broadcasting, in response to receiving a transaction request for the contract deployment sent from the requesting node, the transaction request to the blockchain network, and performing identity validation on the transaction based on a transaction request message, where the transaction request message includes: a method data packet of methods corresponding to the contract deployment request, a parameter data packet corresponding to the methods corresponding to the contract deployment request, a hash value of the contract file, and location information of the contract file; generating, in response to the transaction passing the validation, a block corresponding to the transaction request according to the method data packet of the methods corresponding to the contract deployment request, the parameter data packet corresponding to the methods corresponding to the contract deployment request, the hash value of the contract file, and the location information of the contract file; and writing the block into the blockchain account book based on a consensus mechanism to generate the blockchain account book into which the block is written. Herein, the blockchain account book is updated to dynamically set and issue methods and parameters of a smart contract, so that the implementation of the smart contract is more flexibly. The smart contract has been acknowledged by blockchain consensus parties. During subsequent contract deployment process, a method, a parameter, and an abstract value of a dynamic contract are validated based on the blockchain account book generated in this transaction, thereby ensuring non-repudiation and integrity of the dynamic contract.

Step 103: determining, in response to the contract file passing the validation, a smart contract corresponding to the contract deployment request according to the contract file.

In the present embodiment, after determining that the contract file passes the validation, the executing body may analyze the contract file to obtain the smart contract corresponding to the contract deployment request in the contract file.

It should be noted that the smart contract deployment is a well-known technology that is widely researched and applied at present, and will not be repeated here.

Further referring to FIG. 2, a method 200 for blockchain-based data processing in the present embodiment runs in a service platform 201. After receiving a contract deployment request sent from a requesting node in a blockchain network, the service platform 201 acquires a contract file 202 corresponding to the contract deployment request, then the service platform 201 platforms validation 203 on the contract file based on an analysis result of the contract file and a blockchain account book, and finally, after determining that the contract file passes the validation, the service platform 201 determines a smart contract 204 corresponding to the contract deployment request according to the contract file. The contract file is generated by performing content extension on the smart contract corresponding to the contract deployment request, and the contract file validation is used to characterize validations on a secret key of the contract file, a content of the contract file, and a signature of a contract participant, and the blockchain account book is generated by pre-executing the transaction of the contract deployment.

The method for blockchain-based data processing provided in the above embodiments of present disclosure acquires, in response to receiving a contract deployment request sent from a requesting node in a blockchain network, a contract file corresponding to the contract deployment request, where the contract file is generated by performing content extension on a smart contract corresponding to the contract deployment request, performs validation on the contract file based on an analysis result of the contract file and a blockchain account book, and determines, in response to the contract file validation passing the validation, the smart contract corresponding to the contract deployment request according to the contract file, so as to realizing dynamically load the smart contract file by extending a file format of the smart contract file, and running a new smart contract without the need of restarting a blockchain node. A file type of the smart contract file is extended, to perform safety control on a smart contract binary itself, and achieve the purpose of safely dynamically loading the smart contract. The blockchain account book is generated by pre-executing the transaction of the contract deployment, thereby dynamically setting methods and parameters of a smart contract, and more flexibly limiting a method for implementing the smart contract and a template for implementing the smart contract. The validation is performed based on a secret key of the contract file, a content of the contract file, and a signature of a contract participant, thereby avoiding security risks and a possibility of secret key leakage caused by introducing a third-party secret key center in the prior art, and ensuring non-repudiation and integrity of a contract deployer and a contract approver.

Further referring to FIG. 3, a schematic diagram 300 of the method for blockchain-based data processing according to a second embodiment is shown. The process of the method includes the following steps:

Step 301: acquiring, in response to receiving a contract deployment request sent from a requesting node in a blockchain network, a contract file corresponding to the contract deployment request.

In some alternative implementations of the present embodiment, the acquiring the contract file corresponding to the contract deployment request includes: acquiring a contract file corresponding to location information of the contract file based on location information of the contract file in a blockchain account book, thereby accurately and quickly querying the contract file is realized.

Step 302: analyzing a content of the contract file to obtain a method name data packet of methods in the contract file, a parameter data packet corresponding to the methods in the contract file, a signature data packet of a contract participant, and a secret key packet of the contract file.

In the present embodiment, an executing body may analyze a content of the contract file to obtain the method name data packet of the methods in the analyzed contract file, the parameter data packet corresponding to the methods in the contract file, the signature data packet of the contract participant, and the secret key packet of the contract file. The secret key packet is generated by encrypting the requesting node.

In some alternative implementations of the present embodiment, the method name data packet is generated by encrypting method name(s) based on a first encryption algorithm; and/or the parameter data packet is generated by encrypting parameter(s) based on a second encryption algorithm. The first encryption algorithm may be same as, or may be different from, the second encryption algorithm. The data packet is encrypted, so that the smart contract is difficult to be tampered with, thereby increasing the security of information transmission.

Step 303: performing validation on the contract file based on the method name data packet of the methods in the contract file, the parameter data packet corresponding to the methods in the contract file, the signature data packet of the contract participant, the secret key packet of the contract file, and a blockchain account book.

In the present embodiment, the executing body may perform validation on the contract file based on the method name data packet of the methods in the contract file, the parameter data packet corresponding to the methods in the contract file, the signature data packet of the contract participant, the secret key packet of the contract file, and the blockchain account book, using a preset validation method. The contract file validation is used to characterize validation on a secret key of the contract file, a content of the contract file, and a signature of the contract participant, and the blockchain account book is generated by pre-executing the transaction of the contract deployment.

In some alternative implementations of the present embodiment, the performing validation on the contract file based on the method name data packet of the methods in the contract file, the parameter data packet corresponding to the methods in the contract file, the signature data packet of the contract participant, the secret key packet of the contract file, and the blockchain account book includes: performing secret key validation on the contract file according to the secret key packet of the contract file, where the secret key validation is used to characterize validation on a public-private key pair of the requesting node; performing validation on the contract participant according to the signature data packet of the contract participant; querying the blockchain account book to obtain method names of methods corresponding to the contract deployment request and parameter information corresponding to the methods corresponding to the contract deployment request, and performing, according to the obtained method names and the obtained parameter information, validation on the method name data packet of the methods in the contract file and the parameter data packet corresponding to the methods in the contract file; and determining whether the contract file passes the validation according to a result of the secret key validation on the contract file, a result of the validation on the contract participant, and a result of the validation on the method name data packet of the methods in the contract file and the parameter data packet corresponding to the methods in the contract file. The multi-dimensional validation in many ways more safely ensures non-repudiation, integrity, and confidentiality of the smart contract.

In some alternative implementations of the present embodiment, the performing validation on the contract file based on the method name data packet of the methods in the contract file and the parameter data packet corresponding to the methods in the contract file includes: performing validation on the contract file based on a ciphertext of the method name data packet; and/or performing validation on the contract file based on a ciphertext of the parameter data packet, thus further ensuring the confidentiality of the smart contract.

In some alternative implementations of the present embodiment, the performing validation on the contract file based on the method name data packet of the methods in the contract file and the parameter data packet corresponding to the methods in the contract file includes: performing validation on the contract file based on a ciphertext of a smart contract file in the contract file, thus further ensuring the confidentiality of the smart contract.

Step 304: determining, in response to the contract file passing the validation, a smart contract corresponding to the contract deployment request according to the contract file.

In some alternative implementations of the present embodiment, the method further includes: deploying the smart contract in the blockchain. Thus, deployment of the smart contract is realized, so that when a service triggers an invoking condition, the smart contract is executed according to actual invoking parameters of a user.

In some alternative implementations of the present embodiment, the method further includes: ending the contract deployment request, in response to the contract file failing to pass the validation, thus saving system resources, and improving the system processing efficiency.

Detailed operations in steps 301 and 304 in the present embodiment are basically same as the operations in steps 101 and 103 in the embodiment shown in FIG. 1, and will not be repeated here.

As can be seen from FIG. 3, compared with the corresponding embodiment of FIG. 1, the schematic diagram 300 of the method for blockchain-based data processing in the present embodiment analyzes a content of a contract file to obtain a method name data packet of methods in the contract file, a parameter data packet corresponding to the methods in the contract file, a signature data packet of a contract participant, and a secret key packet of the contract file, where the secret key packet is generated by performing encrypting operation on a requesting node; performs validation on the contract file based on the method name data packet of the methods in the contract file, the parameter data packet corresponding to the methods in the contract file, the signature data packet of the contract participant, the secret key packet of the contract file, and a blockchain account book. Therefore, double validations, i.e., identity validation on a blockchain node and ciphertext validation on the contract file, are performed, which not only ensuring non-repudiation and integrity of the smart contract, but also ensuring confidentiality of the contract.

Figure 4:
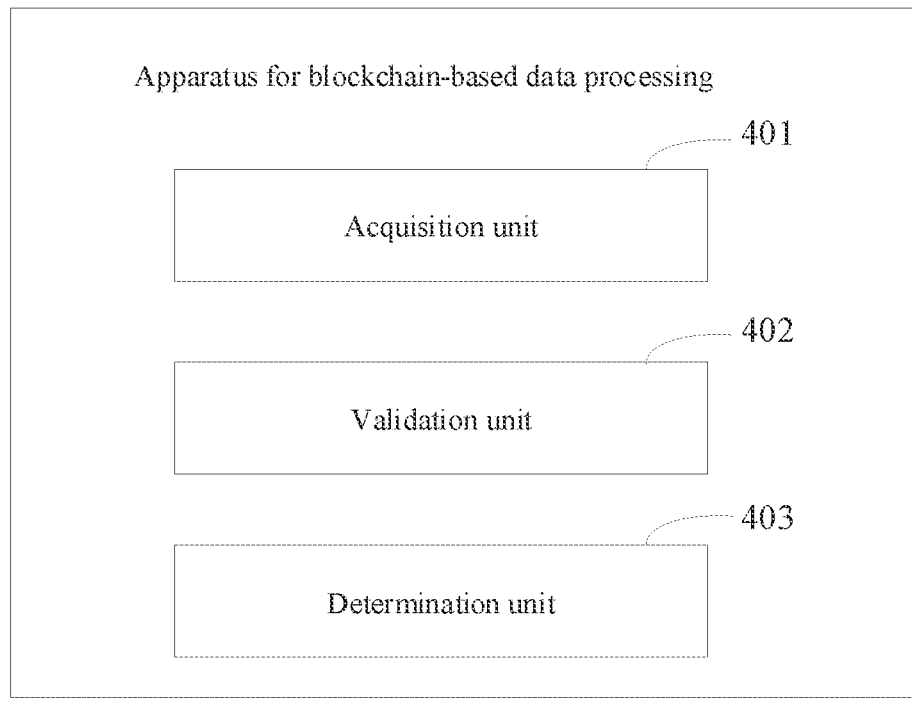
FIG. 4 is a schematic structural diagram of an apparatus for blockchain-based data processing according to an embodiment of the present disclosure.

Further referring to FIG. 4, as an implementation of the method shown in the above FIG. 1-FIG. 3, an embodiment of the present disclosure provides an apparatus for blockchain-based data processing. The embodiment of the apparatus corresponds to the embodiment of the method shown in FIG. 1. The apparatus may be specifically applied to various electronic devices.

As shown in FIG. 4, the apparatus 400 for blockchain-based data processing in the present embodiment includes: an acquisition unit 401, a validation unit 402, and a determination unit 403, where the acquisition unit is configured to acquire, in response to receiving a contract deployment request sent from a requesting node in a blockchain network, a contract file corresponding to the contract deployment request, where the contract file is generated by performing content extension on a smart contract corresponding to the contract deployment request, and the smart contract is an automatically executable service code in the blockchain; the validation unit is configured to perform validation on the contract file based on an analysis result of the contract file and a blockchain account book, wherein the validation is used to characterize performing validation on a secret key of the contract file, a content of the contract file, and a signature of a contract participant, wherein the blockchain account book is generated by pre-executing a contract deployment transaction; and the determination unit is configured to determine, in response to the contract file passing the validation, a smart contract corresponding to the contract deployment request according to the contract file.

The related description of step 101 to step 103 in the corresponding embodiment of FIG. 1 may be referred to for processing details of the acquisition unit 401, the validation unit 402, and the determination unit 403 of the apparatus 400 for blockchain-based data processing in the present embodiment and the technical effects thereof, respectively, which will not be repeated here.

In some alternative implementations of the present embodiment, the validation unit includes: a content analysis module configured to analyze a content of the contract file to obtain a method name data packet of methods in the contract file, a parameter data packet corresponding to the methods in the contract file, a signature data packet of the contract participant, and a secret key packet of the contract file, wherein the secret key packet is generated by performing encrypting operation on the requesting node; and a validation module configured to perform validation on the contract file based on the method name data packet of the methods in the contract file, the parameter data packet corresponding to the methods in the contract file, the signature data packet of the contract participant, the secret key packet of the contract file, and the blockchain account book.

In some alternative implementations of the present embodiment, the validation module includes: a first validation submodule configured to perform secret key validation on the contract file according to the secret key packet of the contract file, where the secret key validation is used to characterize validation on a public-private key pair of the requesting node; a second validation submodule configured to perform validation on the contract participant according to the signature data packet of the contract participant; a third validation submodule configured to query the blockchain account book to obtain method names of methods corresponding to the contract deployment request and parameter information corresponding to the methods corresponding to the contract deployment request, and perform validation on the method name data packet of the methods in the contract file and the parameter data packet corresponding to the methods in the contract file based on the obtained method names and the obtained parameter information; and a determination submodule configured to determine whether the contract file passes the validation according to a result of the secret key validation on the contract file, a result of the validation on the contract participant, and a result of the validation on the method name data packet of the methods in the contract file and the parameter data packet corresponding to the methods in the contract file.

In some alternative implementations of the present embodiment, the blockchain account book is generated using: a transaction validation module configured to broadcast, in response to receiving a transaction request for contract deployment sent from the requesting node, the transaction request to the blockchain network, and performing validation on the transaction based on a transaction request message, wherein the transaction request message comprises: a method data packet of the methods corresponding to the contract deployment request, the parameter data packet corresponding to the methods corresponding to the contract deployment request, a hash value of the contract file, and location information of the contract file; a generation module configured to generate, in response to the transaction passing the validation, a block corresponding to the transaction request according to the method data packet of the methods corresponding to the contract deployment request, the parameter data packet corresponding to the methods corresponding to the contract deployment request, the hash value of the contract file, and the location information of the contract file; and a writing module configured to write, based on a consensus mechanism, the block into the blockchain account book to generate the blockchain account book into which the block is written.

In some alternative implementations of the present embodiment, the acquisition unit is further configured to acquire a contract file corresponding to the location information of the contract file based on the location information of the contract file in the blockchain account book.

In some alternative implementations of the present embodiment, the method name data packet in the content analysis module is generated by encrypting a method name based on a first encryption algorithm; and/or the parameter data packet in the content analysis module is generated by encrypting a parameter based on a second encryption algorithm.

In some alternative implementations of the present embodiment, the validation module is further configured to perform validation on the contract file based on a ciphertext of the method name data packet; and/or perform validation on the contract file based on a ciphertext of the parameter data packet.

In some alternative implementations of the present embodiment, the apparatus further includes: a deployment unit configured to deploy the smart contract in the blockchain, so that when a service triggers an invoking condition, the smart contract is executed.

In some alternative implementations of the present embodiment, the apparatus further includes: an ending unit configured to end the contract deployment request, in response to the contract file failing to pass the validation.

According to an embodiment of the present disclosure, an electronic device and a readable storage medium are provided.

Figure 5:
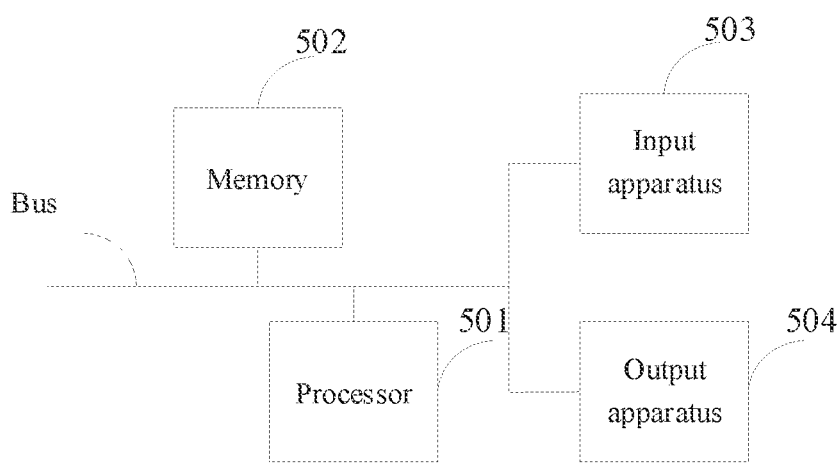
FIG. 5 is a block diagram of an electronic device configured to implement the method for blockchain-based data processing of embodiments of the present disclosure.

As shown in FIG. 5, a block diagram of an electronic device configured to implement the method for blockchain-based data processing according to embodiments of the present disclosure is shown. The electronic device is intended to represent various forms of digital computers, such as a laptop computer, a desktop computer, a workbench, a personal digital assistant, a server, a blade server, a mainframe computer, and other suitable computers. The electronic device may further represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 5, the electronic device includes: one or more processors 501, a memory 502, and interfaces for connecting various components, including a high-speed interface and a low-speed interface. The various components are interconnected using different buses, and may be mounted on a common motherboard or in other manners as required. The processor may process instructions for execution within the electronic device, including instructions stored in the memory or on the memory to display graphical information for a GUI on an external input/output apparatus (e.g., a display device coupled to an interface). In other implementations, a plurality of processors and/or a plurality of buses may be used, as appropriate, along with a plurality of memories and a plurality of memories. Similarly, a plurality of electronic devices may be connected, with each device providing portions of necessary operations (e.g., as a server array, a group of blade servers, or a multi-processor system). In FIG. 5, a processor 501 is taken as an example.

The memory 502 is a non-transitory computer-readable storage medium provided in embodiments of the present disclosure. The memory stores instructions executable by at least one processor, such that the at least one processor executes the method for blockchain-based data processing provided in embodiments of the present disclosure. The non-transitory computer-readable storage medium of embodiments of the present disclosure stores computer instructions. The computer instructions are used for causing a computer to execute the method for blockchain-based data processing provided in embodiments of the present disclosure.

As a non-transitory computer-readable storage medium, the memory 502 may be configured to store non-transitory software programs, non-transitory computer-executable programs and modules, e.g., the program instructions/modules (e.g., the acquisition unit 401, the validation unit 402, and the determination unit 403 shown in FIG. 4) corresponding to the method for blockchain-based data processing in embodiments of the present disclosure. The processor 501 runs non-transitory software programs, instructions, and modules stored in the memory 502, to execute various function applications and data processing of a server, i.e., implementing the method for blockchain-based data processing in the above embodiments of the method.

The memory 502 may include a program storage area and a data storage area, where the program storage area may store an operating system and an application program required by at least one function; and the data storage area may store, e.g., data created based on use of the electronic device for blockchain-based data processing. Further, the memory 502 may include a high-speed random access memory, and may further include a non-transitory memory, such as at least one disk memory device, a flash device, or other non-transitory solid-state memory devices. In some embodiments, the memory 502 alternatively includes memories disposed remotely relative to the processor 501, and these remote memories may be connected to the electronic device for blockchain-based data processing via a network. Examples of the above network include, but are not limited to, the Internet, an intranet, a local area network, a mobile communication network, and a combination thereof.

The electronic device of the method for blockchain-based data processing may further include: an input apparatus 503 and an output apparatus 504. The processor 501, the memory 502, the input apparatus 503, and the output apparatus 504 may be connected through a bus or other means. Bus connection is taken as an example in FIG. 5.

The input apparatus 503 may receive inputted number or character information, and generate a keying signal input related to user settings and function control of the electronic device for blockchain-based data processing, e.g., an input apparatus such as a touch screen, a keypad, a mouse, a trackpad, a touchpad, an indicating arm, one or more mouse buttons, a trackball, and a joystick. The output apparatus 504 may include a display device, an auxiliary lighting apparatus (e.g., an LED), a haptic feedback apparatus (e.g., a vibration motor), and the like. The display device may include, but is not limited to, a liquid crystal display (LCD), a light emitting diode (LED) display, and a plasma display. In some implementations, the display device may be a touch screen.

Various implementations of the systems and technologies described herein may be implemented in a digital electronic circuit system, an integrated circuit system, an ASIC (application specific integrated circuit), computer hardware, firmware, software, and/or a combination thereof. The various implementations may include: an implementation in one or more computer programs that are executable and/or interpretable on a programmable system including at least one programmable processor, which may be a special-purpose or general-purpose programmable processor, and may receive data and instructions from, and transmit data and instructions to, a storage system, at least one input apparatus, and at least one output apparatus.

These computing programs (also known as programs, software, software applications, or code) include machine instructions for a programmable processor, and may be implemented in an advanced procedural and/or object-oriented programming language, and/or in an assembly/machine language. As used herein, the terms "machine-readable medium" and "computer-readable medium" refer to any computer program product, device, and/or apparatus (e.g., a magnetic disk, an optical disk, a memory, or a programmable logic device (PLD)) configured to provide machine instructions and/or data to a programmable processor, and include a machine-readable medium receiving machine instructions as machine-readable signals. The term "machine-readable signal" refers to any signal used to provide machine instructions and/or data to a programmable processor.

To provide interaction with a user, the systems and technologies described herein may be implemented on a computer that is provided with: a display apparatus (e.g., a CRT (cathode ray tube) or a LCD (liquid crystal display) monitor) configured to display information to the user; and a keyboard and a pointing apparatus (e.g., a mouse or a trackball) by which the user can provide an input to the computer. Other kinds of apparatuses may be further configured to provide interaction with the user. For example, a feedback provided to the user may be any form of sensory feedback (e.g., visual feedback, auditory feedback, or haptic feedback); and an input may be received from the user in any form (including an acoustic input, a voice input, or a tactile input).

The systems and technologies described herein may be implemented in a computing system (e.g., as a data server) that includes a back-end component, or a computing system (e.g., an application server) that includes a middleware component, or a computing system (e.g., a user computer with a graphical user interface or a web browser through which the user can interact with an implementation of the systems and technologies described herein) that includes a front-end component, or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and usually interact via a communication network. The relationship between the client and the server arises by virtue of computer programs that run on corresponding computers and have a client-server relationship with each other.

The technical schemes according to embodiments of the present disclosure acquire, in response to receiving a contract deployment request sent from a requesting node in a blockchain network, a contract file corresponding to the contract deployment request, where the contract file is generated by performing content extension on a smart contract corresponding to the contract deployment request, perform validation on the contract file based on an analysis result of the contract file and a blockchain account book, and determine, in response to the contract file passing the validation, a smart contract corresponding to the contract deployment request according to the contract file, so as to realizing dynamically load the smart contract file by extending a file format of the smart contract file, and running a new smart contract without the need of restarting a blockchain node. A file type of the smart contract file is extended, to perform safety control on a smart contract binary itself, and achieve the purpose of safely dynamically loading the smart contract. The blockchain account book is generated by pre-executing the transaction of the contract deployment, thereby dynamically setting methods and parameters of a smart contract, and more flexibly limiting a method for implementing the smart contract and a template for implementing the smart contract. The validation is performed based on a secret key of the contract file, a content of the contract file, and a signature of a contract participant, thereby avoiding security risks and a possibility of secret key leakage caused by introducing a third-party secret key center in the prior art, and ensuring non-repudiation and integrity of a contract deployer and a contract approver.

It should be understood that the various forms of processes shown above may be used to reorder, add, or delete steps. For example, the steps described in embodiments of the present disclosure may be executed in parallel, sequentially, or in different orders, as long as the desired results of the technical schemes disclosed in embodiments of the present disclosure can be achieved. This is not limited herein.

The above specific implementations do not constitute a limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. A method for blockchain-based data processing, comprising:

in response to receiving a contract deployment request sent from a requesting node in a blockchain network, acquiring a contract file corresponding to the contract deployment request, wherein the contract file is generated by performing content extension on a smart contract corresponding to the contract deployment request, and the smart contract is an automatically executable service code in the blockchain;

performing validation on the contract file based on an analysis result of the contract file and a blockchain account book, wherein the validation is used to characterize performing validation on a secret key of the contract file, a content of the contract file, and a signature of a contract participant, wherein the blockchain account book is generated by pre-executing a contract deployment transaction; and in response to the contract file passing the validation, determining a smart contract corresponding to the contract deployment request according to the contract file.

2. The method according to claim 1, wherein the performing validation on the contract file based on the analysis result of the contract file and the blockchain account book comprises:

analyzing a content of the contract file to obtain a method name data packet of methods in the contract file, a parameter data packet corresponding to the methods in the contract file, a signature data packet of the contract participant, and a secret key packet of the contract file, wherein the secret key packet is generated by performing encrypting operation on the requesting node; and performing validation on the contract file based on the method name data packet of the methods in the contract file, the parameter data packet corresponding to the methods in the contract file, the signature data packet of the contract participant, the secret key packet of the contract file, and the blockchain account book.

3. The method according to claim 2, wherein the performing validation on the contract file based on the method name data packet of the methods in the contract file, the parameter data packet corresponding to the methods in the contract file, the signature data packet of the contract participant, the secret key packet of the contract file, and the blockchain account book comprises:

performing secret key validation on the contract file according to the secret key packet of the contract file, wherein the secret key validation is used to characterize validation on a public-private key pair of the requesting node;

performing validation on the contract participant according to the signature data packet of the contract participant;

querying the blockchain account book to obtain method names of methods corresponding to the contract deployment request and parameter information corresponding to the methods corresponding to the contract deployment request, and performing validation on the method name data packet of the methods in the contract file and the parameter data packet corresponding to the methods in the contract file based on the obtained method names and the obtained parameter information; and determining whether the contract file passes the validation according to a result of the secret key validation on the contract file, a result of the validation on the contract participant, and a result of the validation on the method name data packet of the methods in the contract file and the parameter data packet corresponding to the methods in the contract file.

4. The method according to claim 1, wherein the blockchain account book is generated by:

in response to receiving a transaction request for contract deployment sent from the requesting node, broadcasting the transaction request to the blockchain network, and performing validation on the transaction based on a transaction request message, wherein the transaction request message comprises: a method data packet of the methods corresponding to the contract deployment request, the parameter data packet corresponding to the methods corresponding to the contract deployment request, a hash value of the contract file, and location information of the contract file;

in response to the transaction passing the validation, generating a block corresponding to the transaction request according to the method data packet of the methods corresponding to the contract deployment request, the parameter data packet corresponding to the methods corresponding to the contract deployment request, the hash value of the contract file, and location information of the contract file; and writing, based on a consensus mechanism, the block into the blockchain account book to generate the blockchain account book into which the block is written.

5. The method according to claim 4, wherein the acquiring the contract file corresponding to the contract deployment request comprises:

acquiring a contract file corresponding to the location information of the contract file based on the location information of the contract file in the blockchain account book.

6. The method according to claim 2, wherein the method name data packet is generated by encrypting a method name based on a first encryption algorithm; and/or the parameter data packet is generated by encrypting a parameter based on a second encryption algorithm.

7. The method according to claim 6, wherein the performing validation on the contract file based on the method name data packet of the methods in the contract file and the parameter data packet corresponding to the methods in the contract file comprises:

performing validation on the contract file based on a ciphertext of the method name data packet; and/or performing validation on the contract file based on a ciphertext of the parameter data packet.

8. The method according to claim 1, wherein the method further comprises:
deploying the smart contract in the blockchain, so that when a service triggers an invoking condition, the smart contract is executed.

9. The method according to claim 1, wherein the method further comprises:
ending the contract deployment request, in response to the contract file failing to pass the validation.

10. An apparatus for blockchain-based data processing, comprising:
at least one processor; and
a memory storing instructions, the instructions when executed by the at least one processor, cause the at least one processor to perform operations, the operations comprising
acquiring, in response to receiving a contract deployment request sent from a requesting node in a blockchain network, a contract file corresponding to the contract deployment request, wherein the contract file is generated by performing content extension on a smart contract corresponding to the contract deployment request, and the smart contract is an automatically executable service code in the blockchain;
performing validation on the contract file based on an analysis result of the contract file and a blockchain account book, wherein the validation is used to characterize performing validation on a secret key of the contract file, a content of the contract file, and a signature of a contract participant, wherein the blockchain account book is generated by pre-executing a contract deployment transaction; and
determining, in response to the contract file passing the validation, a smart contract corresponding to the contract deployment request according to the contract file.

11. The apparatus according to claim 10, wherein the performing validation on the contract file based on the analysis result of the contract file and the blockchain account book comprises:
analyzing a content of the contract file to obtain a method name data packet of methods in the contract file, a parameter data packet corresponding to the methods in the contract file, a signature data packet of the contract participant, and a secret key packet of the contract file, wherein the secret key packet is generated by performing encrypting operation on the requesting node; and
performing validation on the contract file based on the method name data packet of the methods in the contract file, the parameter data packet corresponding to the methods in the contract file, the signature data packet of the contract participant, the secret key packet of the contract file, and the blockchain account book.

12. The apparatus according to claim 11, wherein the performing validation on the contract file based on the method name data packet of the methods in the contract file, the parameter data packet corresponding to the methods in the contract file, the signature data packet of the contract participant, the secret key packet of the contract file, and the blockchain account book comprises:
performing secret key validation on the contract file according to the secret key packet of the contract file, wherein the secret key validation is used to characterize validation on a public-private key pair of the requesting node;

performing validation on the contract participant according to the signature data packet of the contract participant;
querying the blockchain account book to obtain method names of methods corresponding to the contract deployment request and parameter information corresponding to the methods corresponding to the contract deployment request, and performing validation on the method name data packet of the methods in the contract file and the parameter data packet corresponding to the methods in the contract file based on the obtained method names and the obtained parameter information; and
determining whether the contract file passes the validation according to a result of the secret key validation on the contract file, a result of the validation on the contract participant, and a result of the validation on the method name data packet of the methods in the contract file and the parameter data packet corresponding to the methods in the contract file.

13. The apparatus according to claim 10, wherein the blockchain account book is generated by:
broadcasting, in response to receiving a transaction request for contract deployment sent from the requesting node, the transaction request to the blockchain network, and performing validation on the transaction based on a transaction request message, wherein the transaction request message comprises: a method data packet of the methods corresponding to the contract deployment request, the parameter data packet corresponding to the methods corresponding to the contract deployment request, a hash value of the contract file, and location information of the contract file;
generating, in response to the transaction passing the validation, a block corresponding to the transaction request according to the method data packet of the methods corresponding to the contract deployment request, the parameter data packet corresponding to the methods corresponding to the contract deployment request, the hash value of the contract file, and the location information of the contract file; and
writing, based on a consensus mechanism, the block into the blockchain account book to generate the blockchain account book into which the block is written.

14. The apparatus according to claim 13, wherein the acquiring the contract file corresponding to the contract deployment request comprises:
acquiring a contract file corresponding to the location information of the contract file based on the location information of the contract file in the blockchain account book.

15. The apparatus according to claim 11, wherein the method name data packet is generated by encrypting a method name based on a first encryption algorithm; and/or the parameter data packet is generated by encrypting a parameter based on a second encryption algorithm.

16. The apparatus according to claim 15, wherein the performing validation on the contract file based on the method name data packet of the methods in the contract file and the parameter data packet corresponding to the methods in the contract file comprises:
performing validation on the contract file based on a ciphertext of the method name data packet; and/or performing validation on the contract file based on a ciphertext of the parameter data packet.

17. The apparatus according to claim 10, wherein the operations further comprises:

deploying the smart contract in the blockchain, so that when a service triggers an invoking condition, the smart contract is executed.

18. The apparatus according to claim 10, wherein the operations further comprises:
ending the contract deployment request, in response to the contract file failing to pass the validation.

19. A non-transitory computer-readable storage medium, storing computer instructions thereon, wherein the computer instructions are used for causing the computer to execute operations, the operations comprising:
in response to receiving a contract deployment request sent from a requesting node in a blockchain network, acquiring a contract file corresponding to the contract deployment request, wherein the contract file is generated by performing content extension on a smart contract corresponding to the contract deployment request, and the smart contract is an automatically executable service code in the blockchain;
performing validation on the contract file based on an analysis result of the contract file and a blockchain account book, wherein the validation is used to characterize performing validation on a secret key of the contract file, a content of the contract file, and a signature of a contract participant, wherein the blockchain account book is generated by pre-executing a contract deployment transaction; and
in response to the contract file passing the validation, determining a smart contract corresponding to the contract deployment request according to the contract file.

20. The non-transitory computer-readable storage medium according to claim 19, wherein the performing validation on the contract file based on the analysis result of the contract file and the blockchain account book comprises:
analyzing a content of the contract file to obtain a method name data packet of methods in the contract file, a parameter data packet corresponding to the methods in the contract file, a signature data packet of the contract participant, and a secret key packet of the contract file, wherein the secret key packet is generated by performing encrypting operation on the requesting node; and
performing validation on the contract file based on the method name data packet of the methods in the contract file, the parameter data packet corresponding to the methods in the contract file, the signature data packet of the contract participant, the secret key packet of the contract file, and the blockchain account book.

\* \* \* \* \*